Oct. 7, 1969    R. A. PETERSON, JR., ET AL    3,471,171
CLEVIS
Filed Dec. 14, 1967
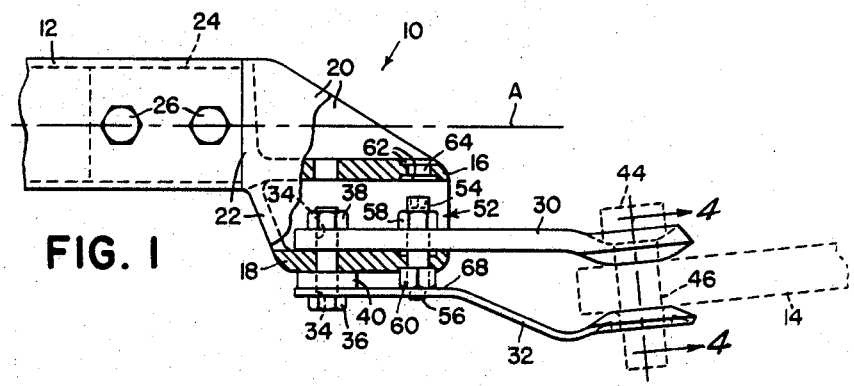
FIG. 1
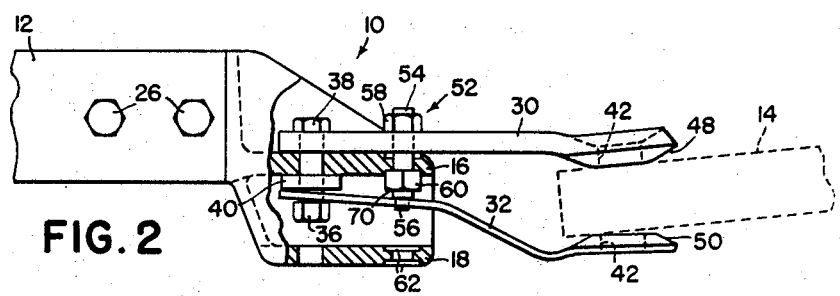
FIG. 2
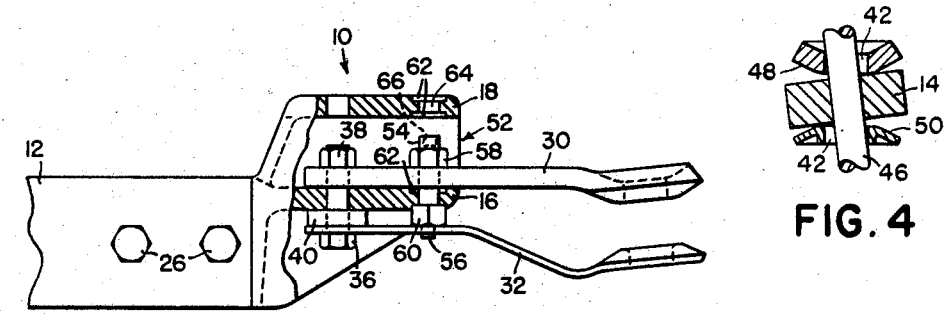
FIG. 3
FIG. 4
INVENTORS.
RUDOLPH A. PETERSON, JR
DONALD H. POLZIN
BY
John C. Thompson
ATTORNEY United States Patent Office 3,471,171
Patented Oct. 7, 1969

3,471,171
CLEVIS
Rudolph Andrew Peterson, Jr., and Donald Herman Polzin, Horicon, Wis., assignors to Deere & Company, Moline, Ill., a corporation of Delaware
Filed Dec. 14, 1967, Ser. No. 690,560
Int. Cl. B60d 7/00, 5/00
U.S. Cl. 280—497　　　　　　　　　　　　　　4 Claims

ABSTRACT OF THE DISCLOSURE

A clevis for interconnecting an implement hitch to tractor drawbars which may be of different thicknesses and of varying heights from the ground. The clevis has spaced apart straps which are adjusted to closely embrace drawbars of different thicknesses. The straps are secured to the implement hitch in different positions of vertical adjustment with respect to the center line of the hitch to match the drawbar height of the tractor.

Field of the invention

The present invention relates in general to hitch devices, and more particularly to a clevis for interconnecting an implement to a tractor having a drawbar.

Description of the prior art

It is common practice to secure implements to tractors by means of a clevis. The clevis is generally U-shaped with the legs of the U disposable about the tractor drawbar. The legs are apertured, and the hitch pin is passed through said apertures and a corresponding aperture in the tractor drawbar to hold the clevis to the drawbar. Since tractor drawbars are of varying thicknesses, it is common practice to make the clevis large enough to embrace the thickest tractor drawbar. However, when a clevis is used with a tractor drawbar of smaller thickness, the clevis will have some vertical movement with respect to the tractor drawbar. This is undesirable, particularly with implements whose hitch should be held a fixed distance above the ground.

Tractors also come with drawbars different heights from the ground. Since in some implements, such as grain drills and the like, it is desirable to have the forward end of the implement hitch at a fixed distance above the ground, it has been necessary to provide some means to secure the clevis of the hitch to tractor drawbars of different heights. A common form of implement hitch has a vertically extending hitch plate with a plurality of vertically spaced apertures to which the clevis may be secured in different positions of vertical adjustment.

Summary of the invention

While the prior art devices have been generally satisfactory for accommodating drawbars of different heights, it is desirable to eliminate the vertically extending hitch plate and provide a more compact structure which can also be positioned in such a manner than implements can be secured to tractor drawbars of different heights.

It is a further object of the present invention to provide a clevis which can be adjusted to closely embrace tractor drawbars of different thicknesses.

These and other objects and advantages of this invention will be apparent to those skilled in the art after a consideration of the following detailed description, taken in conjunction with the accompanying drawings in which a preferred form of this invention is illustrated.

Brief description of the drawings

FIG. 1 is a side view of the clevis of this invention showing the clevis positioned to embrace a drawbar of relatively low height and little thickness.

FIG. 2 illustrates the clevis of this invention engaging a relatively thick drawbar of intermediate height.

FIG. 3 shows the clevis of this invention arranged to engage a relatively thin drawbar of relatively great height.

FIG. 4 is a view taken along the lines 4—4 in FIG. 1.

Description of the preferred embodiment

The clevis of this invention, indicated generally at 10, is adapted to interconnect the forward end of a longitudinally extending implement hitch 12 with a tractor drawbar 14. The implement hitch 12 may be a hollow box beam, as shown in FIG. 1, in which case a portion of the clevis is telescopically received within the beam. Similarly, it may be of circular cross section, or may even be of plate construction. However, it should be noted that the clevis of this invention is illustrated for use with a hitch having a hollow rectangular cross section.

The clevis assembly includes two spaced apart plates, one of which, 16, is spaced relatively closely to the fore-and-aft center line A of the hitch 12, and the other plate, 18, being disposed a further distance away from the center line A. The two plates are interconnected at their sides by side walls 20 and at their rear ends to a generally vertically extending web portion 22. The web portion 22 and side walls 20 are in turn secured to a longitudinally extending portion 24 telescopically received within the hitch 12. The portion 24 is apertured, and the apertures in the portion 24 are aligned with corresponding apertures in the hitch 12 so that nut and bolt assemblies 26 may be employed to non-rotatably secure the clevis to the hitch in one of two positions, one position being shown in FIGS. 1 and 2, and the other position being shown in FIG. 3. The particular cross sectional shape of the portion 24 is not significant to this invention so long as it closely embraces the inner walls of the tube 12 so that the clevis 10 will not tend to shift when secured in its desired position by the nut and bolt assemblies 26.

The plates are disposed either in a low position, such as shown in FIGS. 1 and 2 when it is desired to secure the implement to a tractor having a relatively low drawbar, or the clevis plates are disposed in an upper position when it is desired to secure the hitch to a tractor having a relatively high drawbar.

The clevis strap 30 is disposed above the upper surface of the desired plate and secured thereto. At this point, it should be noted that the strap 30 is secured to the upper surface in either position of the plates 16 and 18. Thus, when the plates are turned over, it is necessary to reposition the clevis strap 30 so that it will be on the upper surface of the plate. A spring steep strap is secured to the lower surface of the plate to which the clevis strap 30 is secured. To facilitate securement, each of the straps is provided with an aperture 34 (FIG. 1) in its rear end through which a bolt 36 may be passed, the bolt 36 being secured in place by means of a nut 38. A washer 40 is disposed between the rear end of the spring steel strap 32 and the lower surface of the plate to which it is desired to be secured.

Each of the straps is provided with a forward end that is apertured, as at 42 (FIG. 2) and through which a hitch pin 44 may be disposed, the hitch pin also passing through a corresponding aperture 46 in the drawbar 14. The distance between the opposed surfaces of the straps 30, 32 may be varied by means set forth below, and the opposed surfaces 48, 50 (FIG. 2) are rounded to reduce the torsional loads in the hitch when going over rough ground.

The upper strap 30 is secured to the desired plate 16, 18 in tight face-to-face engagement by means of the nut and bolt assembly 36, 38 and through a forward fastening device indicated generally at 52. The forward fastening device 52 includes a dog-point set screw 54 whose dog point 56 protrudes through a relatively small aperture in the spring steel strap 32. The set screw 54 is positioned with the dog point 56 passing through the aperture in the spring steel strap 32 to hold the lower strap in alignment with the upper strap so that the apertures 42 are in alignment with each other. Nuts 58 and 60 are disposed about the set screw, the lower nut 60 being received within a recess portion 62 of one of the plates, the recess being disposed to either side of an aperture 64 within the plate. The set screw 54 is provided with a hex recess 66 (FIG. 3) which is used for moving the set screw 54 vertically relative to the associated plates 16, 18.

When the straps 30, 32 are positioned to closely embrace a relatively thin drawbar, as in FIG. 1, the upper surface 68 of the strap 32 will bear against the lower surface 70 of the nut 60 and be held in close engagement therewith by means of the bolt and nut 36, 38. The nuts 58, 60 will be tightened about the set screw 54 to hold it in its desired position.

To position the straps in a spaced apart relation so that they may embrace a drawbar of relatively great thickness, as is illustrated in FIG. 2, the nuts 58, 60 are loosened slightly and the set screw 54 is turned down to force the lower end of the spring steel strap away from the outer end of the clevis strap 30. In some instances it may be necessary to temporarily loosen the nut and bolt assemblies 36 and 38 when adjusting to prevent undue binding between the dog point set screw and strap 32, this being shown in FIG. 2. However, in most situations, it will not be necessary to loosen the nut and bolt assembly.

The clevis straps 30 and 32 will always closely embrace the drawbar 14. The effect of this would be to reduce the dynamic load imposed upon the hitch since chatter and vibration would be eliminated. The lower strap 32 made from spring steel allows the gap to widen as the tractor drawbar is twisted or angled up or down with respect to the implement hitch. The rounded opposed surfaces 48 and 50 on the end of the upper strap 30 and lower strap 32 keep the deflection of 32 to a minimum under these twisting conditions. The holes in straps 30 and 32 are larger than the hitch pin 44 to allow for angular displacement between the hitch and drawbar, as can be seen from FIG. 4.

From the foregoing, it can be seen that the clevis may be assembled in four different height positions and also be adjusted to closed embrace drawbars of different thicknesses. While only two plates (16, 18) are shown in the clevis, it should be obvious to one having ordinary skill in the art that three or more plates could be provided to provide an additional range of adjustments. Other variations will be obvious to those having ordinary skill in the art and the invention should therefore be determined only by the scope of the appended claims.

We claim:

1. A clevis for interconnecting a forwardly extending implement hitch to tractor drawbars of varying thicknesses, said clevis comprising: forwardly extending plate means, means operable to secure said plate means to the forward end of said forwardly extending hitch with said plate means being disposed generally horizontally, a clevis strap securable to the upper surface of said plate means, a second strap securable to the lower surface of said plate means, both of said straps being apertured at their forward ends, releasable securing means operable to rigidly secure the rear portion of said straps to said plate means, and a vertically adjusting member carried by the plate means and acting between the straps at a position forwardly of the securing means to maintain the straps in alignment with each other and for adjusting the spacing between the forward ends of the said straps, the parts being so arranged and constructed that means may be passed through the apertures in said straps and an aperture in said drawbar to interconnect the straps to the drawbar, the drawbar being closely embraced by said straps.

2. The invention set forth in claim 1 in which the adjustable member is a set screw, said set screw passing through aperture means in said plate means, and nut means disposed above and below said aperture means and about said set screw whereby the set screw may be rotated within said nut means to vertically position said set screw relative to said plate means, the lower end of said set screw bearing against the second strap means.

3. The invention set forth in claim 2 in which said set screw includes a dog point which is passable through an aperture in said second strap to hold said second strap in alignment with said clevis strap.

4. A clevis for interconnecting a forwardly extending implement hitch to tractor drawbars of varying thickness and height from the ground, said clevis comprising: a plurality of spaced apart generally parallel plates, means interconnecting said plates and operable to secure said plates to a longitudinally extending hitch in either of two turned-over positions with the plates generally horizontal and in either upper or lower positions with respect to the center line of the longitudinally extending hitch, a clevis strap securable to the upper surface of any selective one of said plates, and a second strap securable to the lower surface of the selective one of said plates, each of said straps having an aperture at its forward end, means operable to releasably and rigidly secure the rear portion of said straps to said one plate with the forward portion of said clevis strap overlying the forward portion of the second strap with said apertures in alignment, and means to adjust the spacing between the forward ends of said straps, the parts being so arranged and constructed that means may be passed through the apertures in said straps and an aperture in said drawbar to interconnect the straps to the drawbar, the drawbar being closely embraced by said straps.

References Cited

UNITED STATES PATENTS

| 1,490,053 | 4/1924 | Willingham et al. | 280—497 |
| 1,770,291 | 7/1930 | Adkins | 280—416 |
| 2,654,613 | 10/1953 | Blair et al. | 280—515 |
| 2,705,157 | 3/1955 | Dail | 280—515 |

LEO FRIAGLIA, Primary Examiner

J. E. SIEGEL, Assistant Examiner

U.S. Cl. X.R.

280—515